Oct. 7, 1930.   C. R. SHORT   1,777,864
PULLEY BELT
Filed April 8, 1927
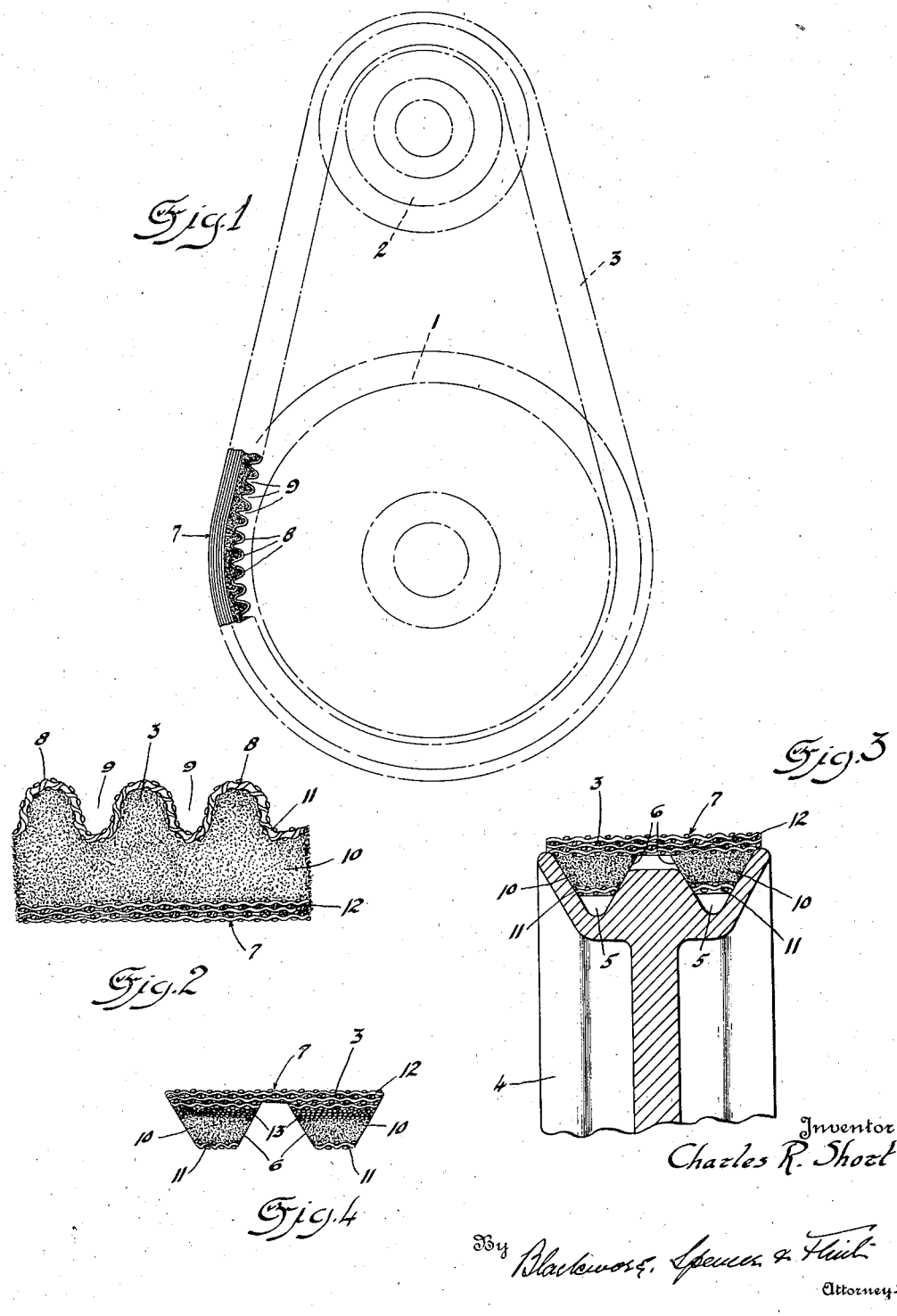
Inventor
Charles R. Short
By Blackmore, Spencer & Flint
Attorneys Patented Oct. 7, 1930

1,777,864

UNITED STATES PATENT OFFICE

CHARLES R. SHORT, OF DETROIT, MICHIGAN, ASSIGNOR TO GENERAL MOTORS RESEARCH CORPORATION, OF DETROIT, MICHIGAN, A CORPORATION OF DELAWARE

PULLEY BELT

Application filed April 8, 1927. Serial No. 182,028.

This invention relates to power transmission belts of the type employed with pulleys having V-shaped grooves.

Power belts having converging driving sides, which fit into and contact with the sides of a V-shaped pulley groove and which are usually of composite formation embodying integrally united laminations of rubber and fabric, have come into quite general usage, particularly as fan belts for motor vehicle engines. In some instances, it is found desirable to provide the driving and driven pulley with two or more V-grooves and to employ a corresponding number of belts to impart the driving effort. In such case, it is imperative that the several belts be of the same length and width, so each will take care of its share of the load, and each must also be capable of substantially the same degree of flexibility or elasticity.

In practice, however considerable trouble is experienced in that it is almost impossible to secure any two belts of uniform characteristics, and to meet the situation, it is proposed to avoid variation and eliminate the difficulties encountered in obtaining a set of belts identical to each other, by substituting for the several individual belts, a single belt cut entirely from one blank, and formed with two or more frictional driving portions, each having convergent contact faces in agreement with corresponding pulley grooves.

In the accompanying drawing, illustrating the present invention Figure 1 shows a belt encircling a pair of pulleys; Figure 2 is portion of the belt in longitudinal section; Figure 3 is a transverse section of the belt in driving engagement with a pulley; and Figure 4 is a transverse section of a modified form of belt construction.

Referring more particularly to the drawing, the reference characters 1, 2 and 3 indicate respectively, a driving pulley, a driven pulley and an endless power transmission belt running around the pulleys. Each pulley 1 and 2 is of multi-groove type and may contain any desired number of annular grooves, arranged side by side, as shown in Figure 3, wherein the pulley 4 is provided with a pair of V-shaped grooves 5—5, the divergent sides or walls of which constitute frictional driving surfaces.

The belt 3 may be of any suitable material, but is preferably formed along the same general lines as that disclosed in my prior Patent No. 1,538,303, May 19, 1925. In the present case, however, two or more longitudinally extending V-shaped or convergent beads or ribs 6—6 are provided, projecting inwardly from an exterior or outer peripheral portion 7. The inwardly projecting portions or ribs 6 extend into the annular grooves 5, and the inclined faces or side walls of the grooves and projections respectively, engage each other in frictional contact, to impart the driving effort from one to the other.

The inner surface of the belt is preferably serrated or cutaway as is clearly shown in the slightly enlarged view Figure 2, with the result that each longitudinally extending bead 6 embodies the teeth 8, with intermediate transverse openings or troughs 9. The openings 9 permit the teeth to crowd together when passing over the pulleys reducing resistance to necessary distortion and resultant frictional heat and wear.

The body of the belt preferably consists of an elastic compound 10 such as rubber, having transversely extending fibres or cords embodied therein, which reinforce the material against lateral compression. A protective fabric covering 11 may be integrally secured to the inner surface of the body 10, to afford a more durable contact surface, while the exterior surface of the belt is formed of several layers 12 of woven fabric, which also form the base portions of the several converging ribs 6. The outer layers of fabric may be relied upon to hold the belt against undue longitudinal stretching, depending on the character of weave, but in some instances it may be found necessary to employ an intermediate strata of straight laid, tightly woven cords, as shown at 13 in Figure 4, for this purpose.

From the above description it will be apparent that there is provided a single belt having the driving effect of several individual V-shaped belts, but which avoids the usual difficulties in selecting and fitting belts of corresponding characteristics for multi-groove pulleys, to equally distribute the pulling strain.

While the novel features have been more or less specifically set forth, it is to be understood that the invention is not limited to the exact details described, but that it is susceptible of such modifications as come within the scope of appended claims.

I claim:

1. A power transmission belt for multi-groove pulleys of composite formation, including an endless flexible band having longitudinally extending endless beads integrally united thereto on its inner surface adapted for driving engagement within annular pulley grooves.

2. A power transmission belt for pulleys having a plurality of V-shaped grooves, including an endless flexible band provided with a plurality of integral inwardly projecting transversely spaced portions of continuous longitudinal extent, each portion being shaped to fit within a pulley groove for frictional driving contact with the walls thereof.

3. An endless flexible power transmission belt for multiple V-shape grooved pulleys embodying a plurality of inwardly convergent longitudinally extending portions adapted to project into the grooves, the relatively inclined sides of each convergent portion being adapted for frictional driving contact with the walls of corresponding pulley grooves, and a peripheral band common to and forming an integral part of said portions.

4. An endless flexible power transmission belt, embodying a plurality of convergent inwardly projecting portions, the converging sides of the respective portions affording frictional contact inclined driving surfaces, and an exterior peripheral portion integrally united in common to the base of each of said convergent portions.

5. An endless flexbile power transmission belt formed by cutting portions away from the inner surface of an endless composite roll, to provide a plurality of inwardly convergent and longitudinally extending ribs, and an exterior peripheral band portion common to each of said ribs.

In testimony whereof I affix my signature.

CHARLES R. SHORT.